March 2, 1926. 1,574,956
T. DE LA MARE
SLIP OR EXPANSION JOINT FOR CONCRETE PIPES
Filed March 4, 1922 3 Sheets-Sheet 1
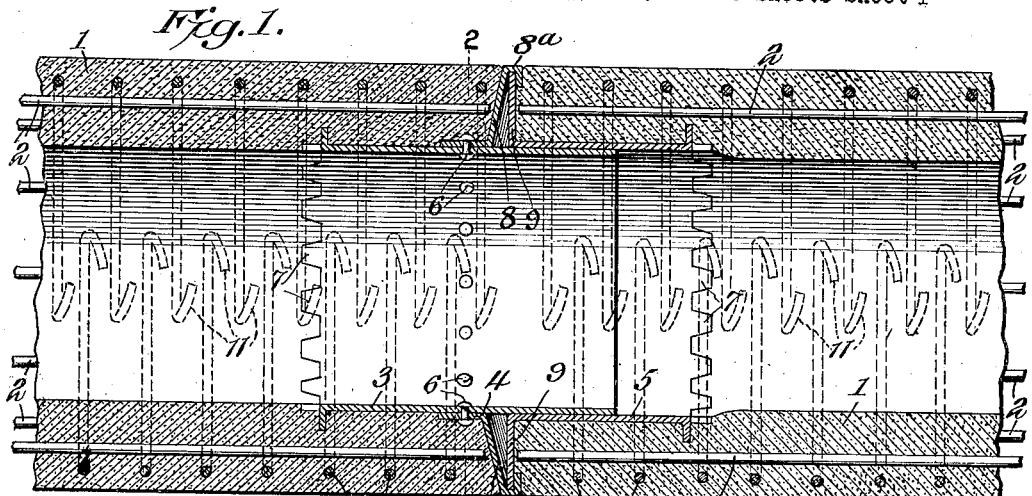

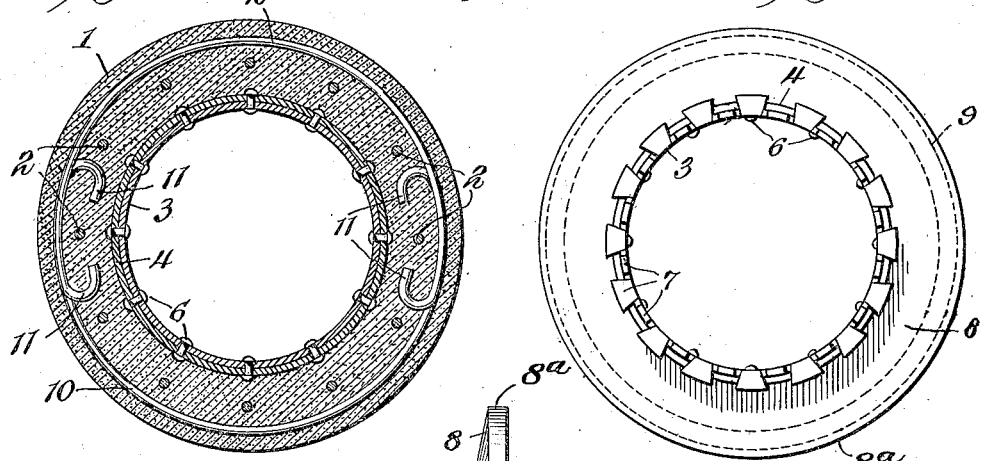
Thomas De La Mare,
INVENTOR,
WITNESSES
Howard D. Orr
F. T. Chapman
BY
ATTORNEY

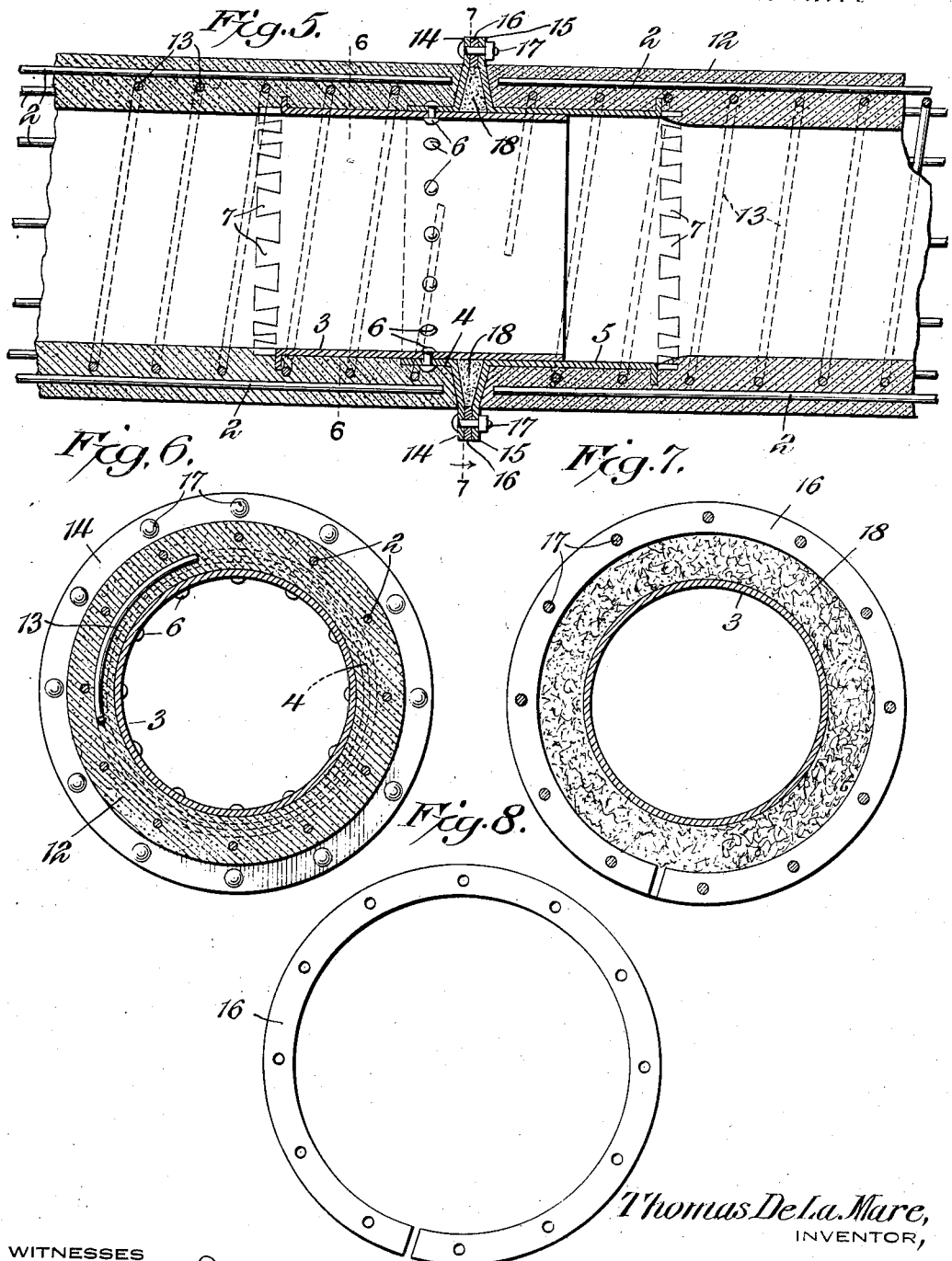

March 2, 1926. 1,574,956
T. DE LA MARE
SLIP OR EXPANSION JOINT FOR CONCRETE PIPES
Filed March 4, 1922  3 Sheets-Sheet 3
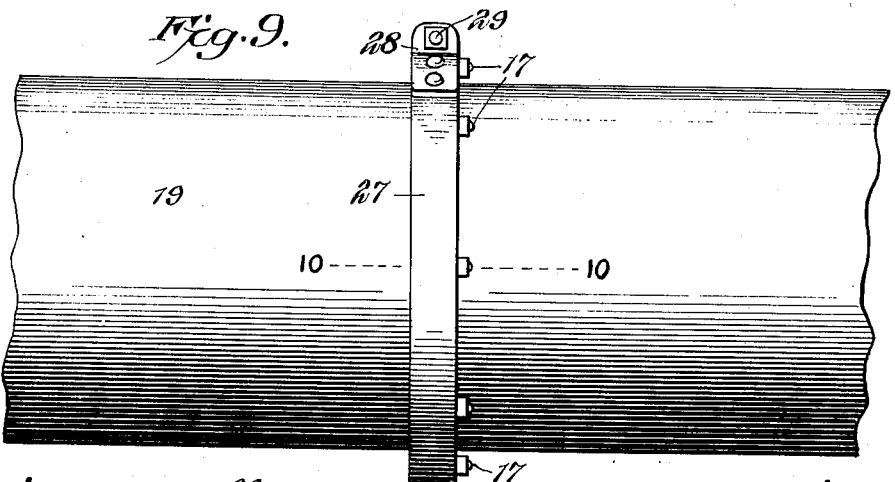
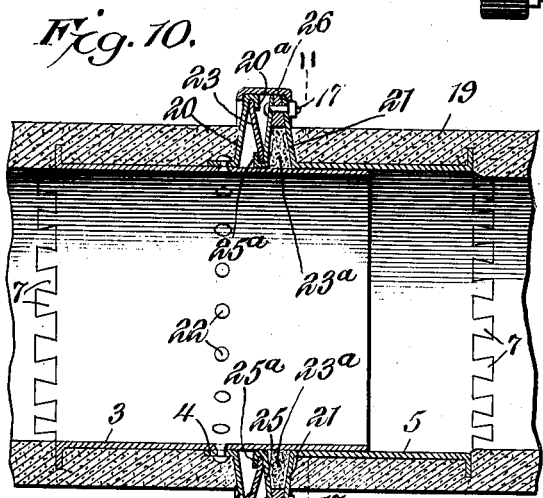
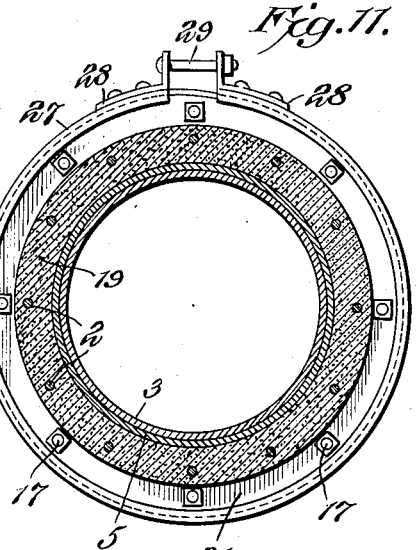
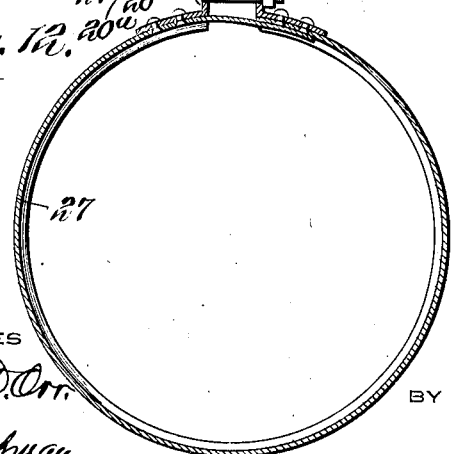
Thomas De La Mare,
INVENTOR,
WITNESSES
BY
ATTORNEY Patented Mar. 2, 1926.

1,574,956

UNITED STATES PATENT OFFICE.

THOMAS DE LA MARE, OF TOOELE, UTAH.

SLIP OR EXPANSION JOINT FOR CONCRETE PIPE.

Application filed March 4, 1922. Serial No. 541,059.

*To all whom it may concern:*

Be it known that I, THOMAS DE LA MARE, a citizen of the United States, residing at Tooele, in the county of Tooele and State of Utah, have invented a new and useful Slip or Expansion Joint for Concrete Pipes, of which the following is a specification.

This invention has reference to slip or expansion joints, and its object is to provide a means whereby concrete pipes may be produced sectionally, or as monolithic pipes of indeterminate length, with expansion joints at intervals to overcome the tendency of the concrete pipe to crack.

When the concrete pipe is made in relatively short lengths, the slip joint is of a construction to span the connected parts of the pipe so as to compensate for expansion and contraction without liability of rupturing the concrete which surrounds and embeds the joint and so prevents cracks which might result in leakage. The joint comprises a series of telescoping sleeves of metal with enclosed reinforcements anchored in the concrete outside of the sleeves and constructed to prevent separation of the concrete at the joint, whereby no path occurs for the escape of the contents of the pipe to the exterior thereof.

The invention will be best understood from a consideration of the following detailed description, taken in connection with the accompanying drawings forming part of this specification, with the understanding, however, that the invention is not confined to any strict conformity with the showinig of the drawings, but may be changed and modified so long as such changes and modifications mark no material departure from the salient features of the invention as expressed in the appended claims.

In the drawings:

Figure 1 is a longitudinal section of the joined ends of a concrete pipe of monolithic construction and embodying features of the invention;

Figure 2 is a section on the line 2—2 of Figure 1;

Figure 3 is an end view of a composite metallic junction sleeve such as shown in Figure 1;

Figure 4 is a side elevation of the sleeve of Figure 3;

Figure 5 is a longitudinal section similar to Figure 1 but illustrating a type of pipe made of separately formed sections, separately connected together at a joint;

Figure 6 is a section on the line 6—6 of Fig. 5;

Figure 7 is a section on the line 7—7 of Fig. 5;

Figure 8 is an elevation of a lead gasket employed in the structure of Figure 5;

Figure 9 is an elevation of a pipe joint differing in some respects from the showing of Figures 1 and 5;

Figure 10 is a section on the line 10—10 of Figure 9;

Figure 11 is a section on the line 11—11 of Figure 10;

Figure 12 is a cross section of a clamp employed in the structure of Figures 9, 10 and 11.

In the drawings, there is shown in Figures 1 to 4, a pipe joint in which the body of the pipe is of monolithic construction and formed of concrete walls 1, with longitudinal reinforcing rods 2 extending therealong between the outer and inner surfaces and embedded in the body of the pipe.

In order to prevent liability of cracking of the concrete, which is more or less friable, there are provided expansion joints at infrequent intervals, each made up of tubular sleeves 3, 4 and 5, respectively, and sufficiently long to telescope and overlap; that is, the sleeve 3 is located interior to the sleeves 4 and 5 and the last named sleeves are exterior to the sleeve 3, and the sleeve 5 extends beyond the corresponding end of the sleeve 3, whereby the sleeve 5, which is in abutment with sleeve 4, may slide on the sleeve 3 to compensate for expansion or contraction of the pipe. The sleeves 3 and 4 are joined by a circular series of rivets 6, or other appropriate means of connection, and the outer ends of the sleeves 3 and 5 are alternately slitted at opposite angles to the longitudinal axis of the pipe to form dove-tail projections which are bent radially outward to form tongues 7 in circular series, being punched or cut out of the outer margins of the respective sleeves 3 and 5. Said sleeves 3 and 5 are therefore provided with tooth-like projections, which, when bent radially to the sleeves, are positioned to enter the concrete walls 1 of the pipe at both ends of the joined sleeve-like or tubular reinforcements.

The sleeves 4 and 5 at their abutting ends, are bent into radial flanges 8, 9 respectively, of sufficient length to reach from the sleeves 4 and 5 to the outer margins of the concrete walls 1. The flange 8 is of sufficient length to be returned as at 8a about the flange 9 toward the flange 5, whereby the outer edges of the flanges are interlocked, one with respect to the other, with the marginal portions of the flanges held against separation.

The flange 9 is preferably bent at right angles to the sleeve 5 of which it forms an integral part, while the coacting flange 8 is preferably bent at an obtuse angle to its base portion or sleeve 4, thus providing a triangular space between the flanges with the base thereof toward the axis of the pipe, which may thus expand or contract without undue strain on the peripheral interlocked joint of the flanges.

The sleeves 3 and 4 are held together by the rivets 6, and the sleeves 4 and 5 are held together by the marginal interlocking flanges 8 and 9, wherefore the fact that the flanges 4 and 5 are held together solely by the interlocked outer or peripheral margins of the flanges 8 and 9, permits a degree of slippage between the sleeves 4 and 5, which slippage may be within the elastic limits of the flanges 8 and 9. In the event of longitudinal expansion or contraction of the pipe 1, the sleeves 4 and 5 will move apart or approach each other to a sufficient degree to allow of the same, and will elastically return to normal and at the same time maintain a tight joint, the expansion and contraction causing longitudinal movement of the sleeves 3, 4 and 5, which are metallic, in accordance with the expansion and contraction of the concrete pipe joined thereby.

To further compensate for the expansion and contraction of the concrete pipe at the joint, there is embedded in the joint portion of the pipe a series of semi-circular reinforcing rods or bars 10, having their ends brought into overlapping relation and there returned upon themselves to provide hooks, 11 thus anchoring the reinforcing bars 10 against pulling out of the concrete. The rings 10 resist circumferential expansion at the joint, and the rods 2 resist longitudinal expansion at the joint in conjunction with the interlocked flanges 8 and 9.

In building the pipe or conduit as described above and which provides a continuous pipe, made in the trench, from end to end thereof, with the expansion joints and the reinforcements located in position as the operations proceed, it is customary to construct the bottom half first, and for this reason the semi-circular form of transverse reinforcing rods 10 are employed, the lower rods being first set in position within the trench and the concrete poured to a height somewhat below the center of the pipe, when the upper series of semi-circular rods 10 are placed in position and the pouring continued until the entire pipe is formed.

In the structure shown in Figures 5 to 8, there is a sectional concrete pipe structure 12, in certain respects similar to that shown in Figure 1 and associated figures, and where the structures are alike, corresponding reference numerals are employed.

In Figure 5, the circumferential reinforcing rods 10 are replaced by coils 13 extending throughout the length of the section of the pipe between the joints. The two alined sleeves 4 and 5 terminate in radial flanges 14 and 15 respectively, separated near their outer edges by a split ring 16, which may be formed of lead flattened so that it may be lodged between the peripheral portions of the flanges 14 and 15, and there connected by bolts 17, by means of which the ring 16 and the flanges 14 and 15 are joined together, whereby an intermediate layer 18 of jute or oakum is confined between the flanges 14 and 15, the ring 16, and the inner sleeve 3 constituting a substantially impervious and expansible and contractible joint.

As in the first described form, the flanges 14 and 15 have an angular relation to each other, though in this form each flange is inclined to form a triangular space between the same in which the jute or oakum is located as clearly shown in Figure 5. This form constitutes a sectional pipe and is formed outside of the trench in suitable molds (not shown) placed in vertical position, and the coiled or spiral reinforcements positioned therein, when the concrete is poured continuously until the complete pipe section is formed.

In Figures 9 to 12, the concrete pipe, indicated at 19 surrounds a metallic sleeve-like joint composed, as before, of sleeves 3, 4 and 5 constituting an expansible joint. The sleeves 4 and 5 are in alinement, and these sleeves terminate in oppositely inclined flanges 20, 21 respectively, similar to the flanges 8 and 9 or 14 and 15 of Figures 1 to 8 inclusive, but separated in the direction of the length of the joint by a considerably greater distance. The flange 20 is carried by the sleeve 4 which is secured to the sleeve 3 by rivets 22, performing a similar office to the rivets 6, of Figures 1 or 5. The flange 21 corresponds to the flange 9 of Figure 1 or flange 15 of Figure 5, and is oppositely inclined to, but separated in the direction of the length of the concrete pipe from the flange 20. The outer edge of the flange 20 is returned upon itself, as at 20a, and clamps around the outer periphery of an annular ring 23, whose inner edge is, in turn, engaged by the return bend 25a of a similar annular ring 25, the rings 23 and 25 being angularly disposed with relation to each other, the former being substantially parallel to the aforesaid flange 21 and the latter being substantially parallel to the flange 20, thus providing two spaced, triangular recesses.

Between the flange 21 and the ring 25, there is located a body 23ª of jute or oakum, or some like packing material and located between the outer peripheral portions of the ring 25 and the flange 21 is a ring 26 of lead or some other like material, holding the oakum against the sleeve 3 and secured by the bolts 17 passing through the lead ring 26, the ring 25 and flange 21.

Surrounding the flanges 20 and 21, is a ring 27 provided with end clips 28, riveted or otherwise secured to adjacent ends of the ring 27, which is an incomplete ring. The ring 27 has the clips 28 joined by a bolt 29 to unite the ends of the ring, so that it may be made to hug the flanges 20 and 21, tightly together with the rings 23 and 25.

The structure of Figures 9 to 12 is particularly adapted to joints having considerable expansion, say as much as an inch, more or less, while the joints of Figures 1 and 5 allow for a small expansion, say about half an inch. These sizes, however, are subject to considerable variation.

In accordance with the invention, the concrete pipe is composed, in one form of relatively short sections formed in position in end-to-end relation, with slip joints embedded in the concrete to provide for expansion and contraction.

Moreover, the concrete pipe has partially circular reinforcements embedded in the walls of the pipe circumferentially thereof, with the reinforcing devices joined at or approximately at an intermediate point of the height of the pipe.

The pipe joint is of such a construction that small rocks or stones which might interfere with expansion and contraction cannot find access.

In the construction shown in Figures 1 to 4, the slip joint is not bolted together, but is lapped and soldered together. In the form shown in Figures 5 to 8, the joint is bolted together. When the slip joint is molded in a sectional pipe, it is made larger than the wall of the pipe so that it may be bolted together after the pipe is made and while it is being laid in the trench.

In making continuous concrete pipe the slip joint is used every ten to twenty-four feet, while in sectional pipe it is applied every four to eight feet. So far as I am aware, the construction of reinforcement shown in Figures 1 and 2 is novel. The reinforcement is made in two pieces, one lapping the other about two inches at the axial center of the pipe.

What is claimed is:—

1. A concrete pipe comprising a slip joint having sections embedded in the inner face of the concrete with portions extending radially to the outer face of the concrete, and other portions having parallel coacting surfaces permitting appreciable movement longitudinally.

2. A concrete pipe having sections formed in position in end to end relation, with a slip joint having longitudinally movable sections embedded in the inner wall of the pipe, said sections having parallel coacting surfaces permitting appreciable movement longitudinally to provide for contraction and expansion.

3. A concrete pipe composed of sections formed in position in end-to-end relation, and having slip joints embedded in the pipe lengthwise of said pipe and each including cylindrical telescoping portions having an extent of relative movement lengthwise of the pipe.

4. A pipe having walls of concrete with a slip joint embedded in the inner face of the concrete, and comprising cylindrical telescoping sections having parallel co-engaging surface, whereby to provide for longitudinal contraction and expansion.

5. A concrete pipe having walls of concrete and a slip joint embedded in the concrete of the pipe at the inner walls thereof, said joint consisting of three sleeves, two of which are united and two of which are provided with outstanding radial flanges which are connected together at their outer edges.

6. A concrete pipe having walls of concrete and a slip joint embedded in the concrete of the pipe at the inner walls thereof, said joint consisting of two sleeves, one sliding within the other, and a third sleeve rigidly secured to one of the two sleeves and flexibly connected to the other sleeve.

7. A concrete pipe having walls of concrete and a slip joint embedded in the concrete of the pipe at the inner walls thereof, said joint consisting of telescoping sleeves having radially extending flanges extending from the interior outwardly and united at their outer edges.

8. A pipe having walls of concrete, and a slip joint embedded in the inner face of the concrete, said joint consisting of telescoping cylindrical sleeves having parallel co-engaging surfaces, and radially extending flanges extending from the interior of the pipe outwardly at an angle to each other.

9. A concrete pipe having walls of concrete and a slip joint embedded in the concrete of the pipe at the inner walls thereof, said joint consisting of telescoping sleeves having radially extending flanges extending outwardly and arranged at an angle to each other and spaced apart except at their outer edges where they are united.

10. A concrete pipe having walls of concrete and a slip joint embedded in the concrete of the pipe at the inner walls thereof, said joint consisting of telescoping sleeves having radially extending flanges extending from the interior outwardly and having the edge of one flange bent about the edge of the other flange and thereby united.

11. A pipe having walls of concrete, and a slip joint embedded in the inner face of the concrete, said joint consisting of telescoping cylindrical sleeves with parallel co-engaging surfaces and having radially extending flanges extending from the interior outwardly beyond the outer face of the pipe, and means for uniting the outer edges of the flanges.

12. A concrete pipe having walls of concrete, with an inner composite sleeve formed of telescoped united sleeves located at the interior of the pipe, the individual sleeves toward one end of the composite sleeve being riveted together, and said composite sleeve having intermediate outstanding flanges joined together near their outer edges.

13. A pipe having walls of concrete and a slip joint embedded in the inner face of the concrete, said joint including telescoping cylindrical sleeves with coacting parallel surfaces permitting appreciable relative movement longitudinally, the outer ends of the sleeves being provided with radial tongues embedded in the concrete.

14. A pipe having walls of concrete, with an inner composite sleeve formed of telescoped metallic sections located at the interior of the pipe, and having parallel coacting surfaces permitting appreciable relative movement longitudinally, the longitudinal outer ends of the sleeve sections being slit and bent radially to form a circumferential series of anchoring tongues which are embedded in the concrete.

In testimony that I claim the foregoing as my own, I have hereto affixed my signature.

THOMAS DE LA MARE.